United States Patent [19]
Taylor et al.

[11] Patent Number: 5,670,585
[45] Date of Patent: Sep. 23, 1997

[54] USE OF POLYACRYLIC ACID AND OTHER POLYMERS AS ADDITIVES IN FIBERGLASS FORMALDEHYDE BASED BINDERS

[75] Inventors: Thomas J. Taylor, Englewood, Colo.; Paul Nedwick, Lansdale, Pa.

[73] Assignee: Schuller International, Inc., Denver, Colo.

[21] Appl. No.: 489,903

[22] Filed: Jun. 13, 1995

[51] Int. Cl.$^6$ ............ C08L 61/10; C08L 61/28; C08L 33/08

[52] U.S. Cl. .......... 525/508; 525/418; 525/451; 525/502; 525/504; 525/509; 525/518; 525/519

[58] Field of Search .............. 525/418, 451, 525/502, 504, 508, 509, 518, 519

[56] References Cited

U.S. PATENT DOCUMENTS

| | | | |
|---|---|---|---|
| 3,907,737 | 9/1975 | Marx et al. | 260/29.6 |
| 3,980,601 | 9/1976 | Marx et al. | 260/29.6 |
| 4,076,917 | 2/1978 | Swift et al. | 526/49 |
| 4,131,582 | 12/1978 | Kako et al. | 260/29.3 |
| 4,495,980 | 1/1985 | Morley | 164/16 |
| 4,757,108 | 7/1988 | Walisser | 524/596 |
| 5,108,798 | 4/1992 | Guerro et al. | 427/389.8 |
| 5,143,582 | 9/1992 | Arkens et al. | 162/135 |
| 5,185,197 | 2/1993 | Nixon | 428/246 |
| 5,318,990 | 6/1994 | Strauss | 524/549 |
| 5,340,868 | 8/1994 | Strauss et al. | 524/461 |
| 5,538,761 | 7/1996 | Taylor | 427/389.8 |

FOREIGN PATENT DOCUMENTS

| | | |
|---|---|---|
| 0583086 | 2/1994 | European Pat. Off. . |
| 0651088 | 5/1995 | European Pat. Off. . |

OTHER PUBLICATIONS

*Solid State Technology*, Penwell Publishing Co., vol. 38, No. 12, Dec. '95, p. 108.

*Primary Examiner*—W. Robinson H. Clark
*Attorney, Agent, or Firm*—Cornelius P. Quinn

[57] ABSTRACT

A process for preparing binder-coated fiber-glass products employs as a binder aqueous polymer systems comprising a nitrogenous formaldehyde resin such as a urea-extended alkaline phenol/formaldehyde resole together with an acidic polyacrylate which cocure to form a thermoset polymer while synergistically reducing ammonia emissions which normally occur during cure of the nitrogenous formaldehyde resin. The polymer system may be used in applications other than fiberglass where reduced emissions are desired.

30 Claims, 2 Drawing Sheets

USE OF POLYACRYLIC ACID AND OTHER POLYMERS AS ADDITIVES IN FIBERGLASS FORMALDEHYDE BASED BINDERS

TECHNICAL FIELD

The subject invention pertains to binder coated fiberglass products prepared by coating fiber-glass with phenol/formaldehyde or urea/formaldehyde resins in conjunction with a polyacrylate resin to lower emissions during the preparation of the fiberglass product.

BACKGROUND OF THE INVENTION

Fiberglass comes in many shapes and sizes and can be used for a variety of applications. A general discussion of fiberglass manufacturing and technology is contained in *Fiberglass* by J. Gilbert Mohr and William P. Rowe, Van Nostrand Reinhold Company, New York 1978, which is herein incorporated by reference. During the preparation of fiberglass, whether by a blown fiber or continuous filament manufacturing process, the resulting glass fibers may easily be degraded in their strength characteristics by the self-abrasive motion of one fiber passing over or interacting with another. As a result of this self-abrasion, surface defects are caused in the fiberglass filaments resulting in reductions in overall mechanical strength. Furthermore, fiberglass which is destined for use as building insulation and sound attenuation is often shipped in a compressed form to lower shipping costs. When the compressed bundles of fiberglass are utilized at the job site, it is imperative that the fiberglass product recover a substantial amount of its precompressed thickness. Otherwise, loss of insulation and sound attenuation properties may result.

Traditionally, fiberglass has been treated with phenol/formaldehyde resole binders to alleviate the previously-mentioned defects. The phenol/formaldehyde binders utilized in the past have been the highly alkaline resole type which have the combined advantages of inexpensive manufacture and water solubility. Typically, the binders are applied to the fiberglass from aqueous solution shortly after the fibers have been produced, and cured at elevated temperature in a curing oven. Under the curing conditions, any remaining aqueous solvent is evaporated, and the phenol/formaldehyde resole cures to a thermoset state. The fibers in the resulting fiberglass product are thus partially coated with a thin layer of thermoset resin, which tends to accumulate at the junctions where fibers cross each other. The resulting product therefore not only suffers from less self-abrasion, but also exhibits higher recovery than a fiberglass product not incorporating a binder.

The alkaline phenol/formaldehyde resoles contain a fairly large excess of formaldehyde from the manufacturing process. This excess of formaldehyde has been taken advantage of by adding urea to the phenol/formaldehyde resole, resulting in a urea-extended resole. Urea-extended phenol/formaldehyde binders are more cost-effective than the straight phenol/formaldehyde resins, but exhibit some loss in properties as the urea content increases. Thus, efforts have been made to incorporate other resins which can enhance the properties of the binder.

In addition to the use of urea to extend phenol/formaldehyde resins for use in fiberglass binders, other nitrogen containing substances, such as dicyandiamide and melamine, have been utilized as well. Urea, and to a certain extent other amino group containing extenders, serve the dual function of providing a lower cost resin as well as reducing emissions of formaldehyde. Urea, for example, is available at approximately 20% of the cost of the alkaline phenol/formaldehyde resoles commonly used in fiberglass binders. Thus, an extension of the binder with 30% percent urea provides a substantial cost savings.

Moreover, urea is well known as a scavenger for formaldehyde, and incorporation of urea into the resin mix and allowing it to react in, the product being called a "prereact", is known to lower formaldehyde emissions up to approximately the stoichiometry of the urea/formaldehyde reaction. Although additional urea might further lower formaldehyde emissions, at same time, ammonia emissions and "blue smoke" are dramatically increased as the amount of urea or other nitrogenous substances approach and exceed the formaldehyde stoichiometry. Although efforts in the industry to eliminate or substantially reduce formaldehyde are well known, less well known is the fact that ammonia emissions are also under extreme scrutiny, with several states having exceptionally stringent requirements in this regard. Thus, it is desirable to lower both the formaldehyde and ammonia emissions from fiberglass binder compositions.

In U.S. Pat. No. 5,340,868, for example, elimination of formaldehyde and ammonia emissions in fiber-glass binders is achieved by simply completely replacing the phenol/formaldehyde binder with a binder comprising a polycarboxy polymer, a β-hydroxyalkylamide and at least a trifunctional monomeric carboxylic acid. Such binder compositions, however, are more expensive than phenol/formaldehyde binders, and result in a higher cost insulation product. In a similar vein, U.S. Pat. No. 5,318,990 discloses a fibrous glass binder comprising a polycarboxy polymer, a monomeric trihydric alcohol, and a catalyst comprising an alkaline metal salt of a phosphorous-containing organic acid.

In U.S. Pat. No. 5,108,798, is disclosed a binder composition containing a β-hydroxyurethane functional material and a polycarboxylic acid. The '798 patent further suggests that the binder compositions disclosed may be used for partial replacement of phenol/formaldehyde or urea/formaldehyde binders with the degree of formaldehyde reduction proportional to the substitution of the disclosed binder for the alkaline phenol/formaldehyde resoles. However, the β-hydroxy urethane functional materials are higher cost products which drives up the cost of the fiberglass insulation material. Further, there is no evidence that formaldehyde levels would actually decrease when used with phenol/formaldehyde resins, or that the materials might be useful with extended phenol/formaldehyde resins.

In U.S. Pat. No. 4,757,108, attempts to lower formaldehyde emissions involved reacting urea into an alkaline phenol/formaldehyde resole under acidic conditions, followed by neutralization and further addition of urea under basic conditions. To prevent calcium sulfate precipitation during addition of the ammonium sulfate latent catalyst, minor amounts of lignin, polycarboxylic acid dispersants, and sequestering agents are added. However, no results of oven emissions tests are supplied.

Simple dilution of a phenol/formaldehyde resin binder, whether extended with urea or other substances, by a second polymer system which cures without the evolution of formaldehyde, should reduce both the formaldehyde and ammonia levels substantially in proportion to the degree of replacement of the phenol/formaldehyde resin with the second polymer system. However, this has proven not to be the case. Although the resin binder is applied to fiberglass from aqueous solution containing generally from 5% to 20% solids, the water content of the binder diminishes rapidly due to evaporation, due to the binder solution being applied to hot fiberglass as it exits from the spinerette or bushing. Thus, the binder composition prior to cure is not an aqueous system, and at the temperature of the curing oven, traditionally on the order of 150° C. to 250° C., numerous chemical interreactions may occur which would not be expected in an aqueous environment.

It is an object of the present invention to provide a process for binder coating a fiberglass product which, during the coating and curing processes, evolves reduced emissions.

It is a further object of the subject invention to lower the ammonia emissions which occur during the use of nitrogenous substance-extended phenol/formaldehyde resins.

It is a still further object of the subject invention to provide resin systems which may be utilized as binders for fiberglass insulation and for other applications in which reduction of emissions is important.

SUMMARY OF THE INVENTION

The present invention pertains to a process for producing binder coated fiberglass products, during which the overall emissions of formaldehyde and ammonia are reduced. The subject invention further pertains to a novel resin system which is useful for binder treating fiberglass as well as for other uses where reduced emissions are important. The subject binders comprise a phenol/formaldehyde and/or urea/formaldehyde resin system to which a polyacrylate polymer having a substantial quantity of acidic groups is added. The polymer system is able to reduce ammonia emissions over and above that which would be predicted from a simple dilution mechanism. Moreover, the use of the subject polymer systems allows for the elimination or reduction of traditional curing catalysts such as ammonium sulfate, and allows for the incorporation of additional urea which may further lower formaldehyde emissions.

BEST MODE FOR CARRYING OUT THE INVENTION

Figure 1:
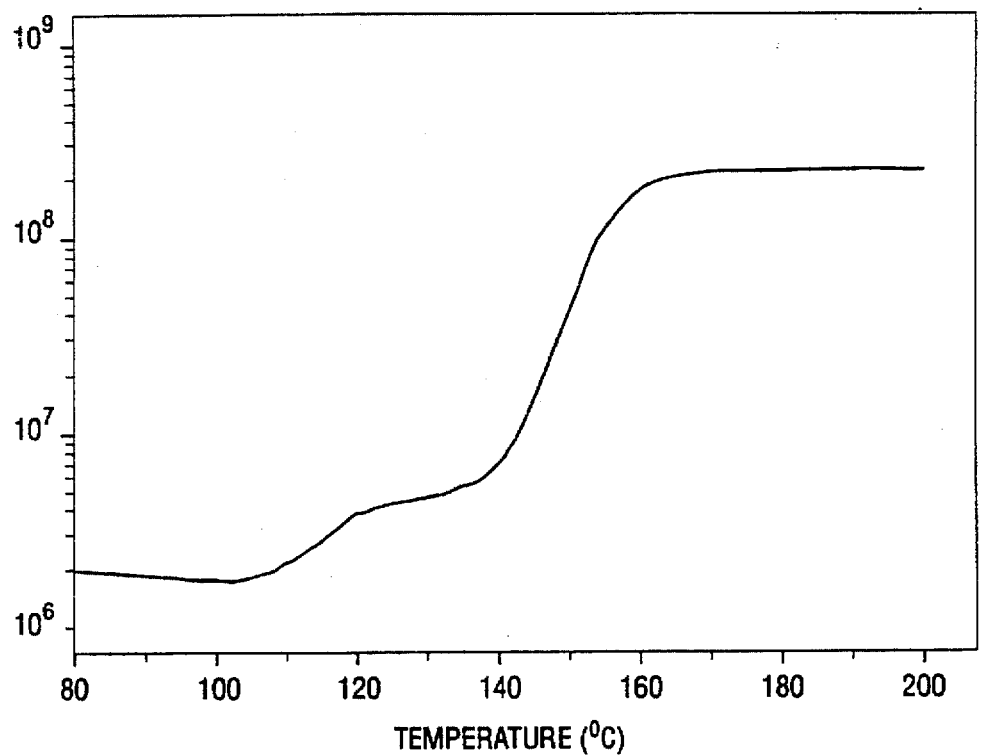
FIG. 1 is a DMA trace for a conventional 70/30 urea extended phenol/formaldehyde binder.
Figure 2:
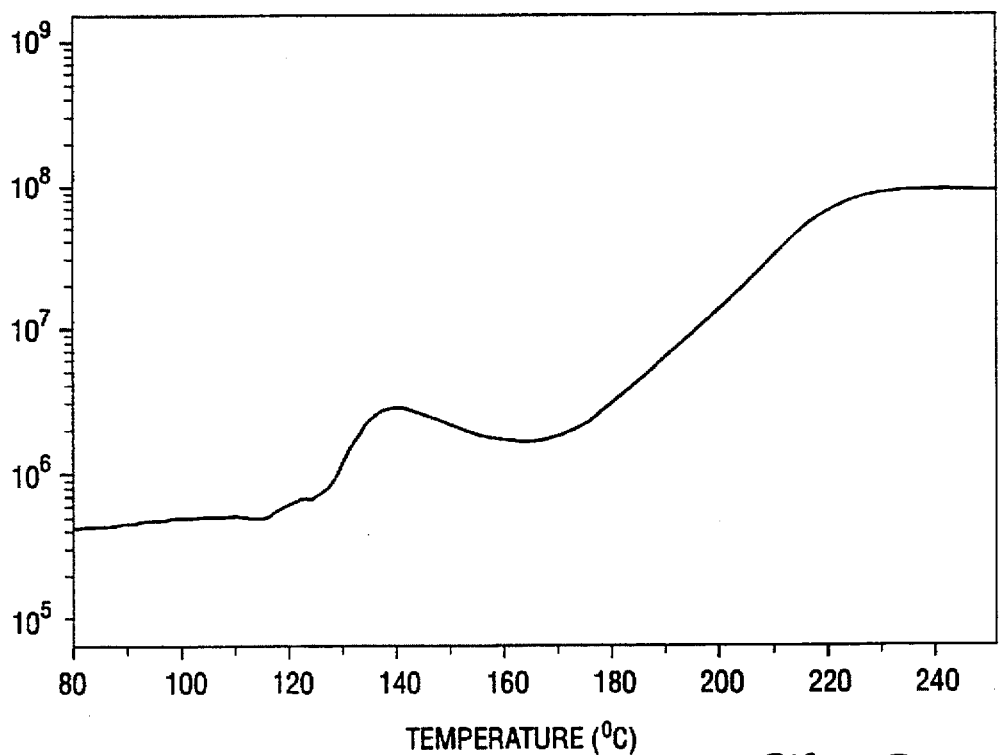
FIG. 2 is a DMA trace for a phenol/formaldehyde resin-free binder containing polyacrylic acid and polyvinylalcohol.

The aqueous polymer solutions of the present invention are prepared conventionally by reacting urea and/or phenol with an excess of formaldehyde, generally under alkaline conditions. The formation of such resin systems is well known to those skilled in the art. Preferably, the polymer solutions of the present invention are phenol/formaldehyde alkaline resole resins initially containing an excess of formaldehyde, which are extended with urea by allowing to react with urea at room temperature for a substantial period of time, i.e. from 8 to 18 hours. The addition of other comonomers, such as dicyandiamide, melamine, methylolmelamine, and methylol urea and other compounds known to those skilled in the art, is also contemplated. The resulting resin systems generally contain from approximately 5% to approximately 60% by weight resin solids, and generally have a pH in the alkaline range, i.e. from 7.0 to about 9.0, more preferably from about 7.5 to about 8.5. Most preferably, the polymer solutions of the present invention contain phenol/formaldehyde and/or melamine/formaldehyde solids to urea solids in the ratio of 80/20 to about 50/50, preferably 70/30 to about 60/40. Although the polymer systems have been described as solutions, all or a portion of the resin solids may be in the form of a dispersion, or emulsion.

Of the total solids contained in the resin system, generally from about 40% to 90%, preferably 45% to about 80% by weight, and most preferably from 50% to about 75% are solids derived from the phenol/formaldehyde solids, optionally including other comonomers such as dicyandiamide, melamine, and urea, while 60% to 5%, preferably 55% to 10% and most preferably 50% to 20% comprise an acid functional polyacrylate. The weight percentages of the acid functional polyacrylate are calculated on the basis of polyacrylic acid homopolymer. Polymers containing greater amounts of carboxyl groups, i.e. polymaleic acid, poly (maleic acid/acrylic acid) copolymers, and the like, may require proportionately less of the acid-functional polyacrylate, while copolymers of unsaturated carboxylic acids and non-functional monomers such as methylmethacrylate or acrylonitrile may require proportionately more of the acid-functional polyacrylate.

The preferred acid functional polyacrylate is polyacrylic acid preferably having a molecular weight of from about 100 to about 200,000, more preferably from about 1000 to about 22,000, and most preferably from about 1000 to about 6000. In general, the molecular weight of the acid functional polyacrylate is end-use dependent, as higher molecular weight polyacrylates tend to increase aqueous viscosity, and thus may render dispersion or spraying of the resin solution difficult. The molecular weight must be such that an aqueous solution, dispersion, or emulsion may be prepared. Other polymers of unsaturated carboxylic or dicarboxylic acids or their anhydrides are also suitable, and are included within the definition of "acid functional polyacrylate" as used herein, for example, polymers of maleic acid, maleic anhydride, methacrylic acid, hexenedioic acid, and the like. Also suitable are copolymers of acrylic acid, maleic acid, methacrylic acid, and other unsaturated mono-carboxylic or dicarboxylic acids or anhydrides.

The acid functional polyacrylates may further be derived from other unsaturated monomers which do not detract from the performance of the subject acid functional polyacrylates in decreasing ammonia emissions. Examples of suitable optional comonomers include acrylonitrile, styrene, α-methylstyrene, paramethylstyrene, vinylbutyrate, methylvinyl ether, the alkylacrylates, i.e. methylmethacrylate, ethylmethacrylate, butylmethacrylate and the like, particularly $C_{1-8}$ alkyl acrylates, and other comonomers such as n-vinylpyrollidone, vinyl acetate, vinyl chloride, vinyl fluoride, and the like. Such polymers and copolymers are well known to those skilled in the art, and are commercially available. The acid containing polyacrylate polymers may be partially neutralized, i.e. with ammonia or organic amines, or alkali metal hydroxides or other neutralizing agents. However, the resulting partially neutralized polyacrylates must have an aqueous pH in the acidic range, and must further be effective to reduce the amount of ammonia produced during the cure of phenyl/formaldehyde and/or urea/formaldehyde resins.

Preferably, at least 40 mol% of the monomers used to prepare the acid containing polymers should contain free carboxylic acid groups, more preferably 60%, and most preferably 80% or more. When a portion of the monomers are dicarboxylic acids, the mol percent of carboxylic acid-containing monomers may be less.

By the term "low total emissions" and similar terms is meant that the resin systems of the present application, during their application to fiberglass or other product requiring coating, emit lower emissions of ammonia and/or formaldehyde than would be produced by the nitrogenous formaldehyde resin alone without the acidic polyacrylate component, generally lower than the level of emissions which would be expected based on simple dilution.

Addition of the acidic polyacrylate to the subject invention resin systems produces resin systems which, during application and cure, emit considerably lower ammonia emissions while formaldehyde emissions may be lowered or remain substantially unchanged with the same degree of nitrogenous extension of the base formaldehyde resin. It is to be expected, however, that incorporation of additional nitrogenous formaldehyde scavengers, for example urea, whether reacted into the resin to form a "prereact" or added to the base resin system "cold", without having opportunity to react in, will cause an increase in ammonia emissions as compared to the same resin system containing less of the nitrogenous extender. In such cases, however, the formaldehyde emissions will decrease, and thus total emissions, expressed in ppm of formaldehyde and/or ammonia, will be less than when the acidic polyacrylate is not utilized. Thus, addition of the acidic polyacrylate gives the formulator a choice of substantially lowering ammonia emissions or lowering ammonia emissions to a lesser degree while also lowering formaldehyde emissions.

The unique aspect of the resin systems of the present invention is that the acid containing polyacrylates are catalytic in the sense that they advance the cure of the phenol/formaldehyde or urea/formaldehyde resins without the necessity of adding additional cure catalysts. However, traditional cure catalysts may be added if necessary, generally in reduced amount. These include latent catalysts such as ammonium sulfate, acid catalysts such as strong mineral acids, monomeric carboxylic or polycarboxylic acids, or hydrolyzable acidifying salts such as aluminum sulfate and aluminum chloride. Such catalysts are generally used in amounts of from 0.1% to 5%, more preferably 0.5% to 4%, by weight relative to total resin solids.

The acidified polyacrylate resin is preferably water-soluble. If not water soluble, the polyacrylate must be capable of forming an emulsion or dispersion when mixed together with the remaining resin system ingredients. The polyacrylate is non-curable in the sense that it is not self-crosslinking and does not substantially co-cure with components present other than the formaldehyde resin components. Some inter and intra polymer anhydride formation is to be expected at elevated cure temperatures. Anhydride formation is not considered "crosslinking," which, for the purposes of the subject application, requires reaction of two different functional groups.

For example, polyacrylic acid, polymaleic acid, polymethacrylic acid, and copolymers of these respective monomers contain only pendant carboxylic acid groups which cannot crosslink to form a crosslinked polymer by themselves. Some anhydride linkages may be formed by loss of water at elevated temperature from the many carboxylic acid groups present. Copolymers containing functional groups or substituents which do not react significantly with carboxyl groups at the elevated curing temperature, such as copolymers containing acrylonitrile, styrene, methylmethacrylate, etc., also meet this limitation.

However, copolymers of unsaturated carboxylic acids with substantial amounts of vinylacetate which has been extensively hydrolyzed to contain free hydroxyl groups, can react by esterification at the cure temperature to form a cross-linked polymer exclusive of the various methylolated species present in the formaldehyde resin. Under such conditions, these curable polyacrylares may polymerize substantially separately from the formaldehyde resin components and reduction of ammonia and/or formaldehyde emissions will be due to a dilution effect only. In some cases ammonia emissions may increase despite significant dilution. By the term "essentially non-reactive with carboxyl groups" is meant functional groups which do not react significantly with carboxyl groups at the cure temperature. Hydroxyl and amino groups are examples of groups which are reactive. Amide groups, due to their much lower reactivity, are essentially non-reactive. The nature of such groups is readily apparent to those skilled in the art. As discussed below, it is further not within the spirit of the invention to incorporate other carboxyl group-reactive monomers or polymers in significant amounts which would significantly decrease the availability of carboxyl groups to react with the various methylolated phenol, urea, and other species present in the formaldehyde resin component.

It would not depart from the spirit of the invention to employ acidic polyacrylate copolymers having a minor amount of carboxyl-reactive functional groups such as hydroxyl or amino groups, provided that the total amount of carboxyl groups is at least about 50 mol percent or more in excess of the number of carboxyl groups which would be expected to react with co-reactive functional groups. Thus, copolymers preferably containing up to about 20 mol percent reactive groups are included in the non-curable acidic polyacrylate, provided that the amount of free carboxyl groups remaining is sufficient to react with the formaldehyde resin components whereby ammonia emissions are reduced.

Preferably, the acidic polyacrylates contain less than 10 mol percent of any carboxyl-reactive species, more preferably less than 5 mol percent, and preferably no carboxyl-reactive species. By the term "non-curable acidic polyacrylate" is also meant that the overall resin system is devoid of significant amounts of added crosslinking agents other than those in the formaldehyde resin itself. In the case of polyacrylic acid, for example, dihydric alcohols such as ethylene glycol and propylene glycol, trihydric alcohols such as trimethylolpropane and glycerine, and polyhydric alcohols such as pentaerythritol, sorbitol, and partially or fully hydrolyzed polyvinylacetate (polyvinylalcohol polymers), poly(hydroxyalkylacrylates) such as poly(2-hydroxyethylacrylate), β-hydroxyurethanes, and β-hydroxyalkylamides may be present only in minor amounts such that a significant fraction of free carboxyl groups remain to react with formaldehyde resin components. It would not depart from the spirit of the invention to employ minor amounts of such compounds, i.e. 10 mol percent or less based on reactive functional moieties relative to total free carboxyl group mol content. However, their incorporation must not prevent ammonia emission decrease, and the stiffness of a cured resin system prepared from the reactive components and acidic polyacrylate exclusive of the formaldehyde resin components should display a stiffness as measured by Dynamic Mechanical Analysis (DMA) at 200° C. of less than 50 percent of that exhibited by the formaldehyde resin alone. Clearly, if any added carboxyl-reactive component does not significantly affect the final stiffness of the overall resin composition and still results in reduced total emissions, then addition of that component falls within the spirit of the invention, as it does not substantially alter the results obtained in its absence.

Having generally described this invention, a further understanding can be obtained by reference to certain specific examples which are provided herein for purposes of illustration only and are not intended to be limiting unless otherwise specified.

To monitor emissions of various resin systems when applied to fiberglass as a binder, a tube furnace comprising a glass tube approximately 30 cm long and 2.54 cm inside diameter is wrapped with a nickel-chromium wire heater and surrounded with a vacuum jacket. The temperature inside the furnace can be monitored by a thermocouple mounted in a thermocouple well placed between the heater wire and the wall of the inside tube. A sample support tube consisting of a 3.8 cm long piece of 1.9 cm diameter pyrex glass tubing is loaded with a sample which consists of a glass microfiber filter (Whatman 5.5 cm GF/B) to which approximately 0.5 g of the final binder solution is placed and weighed to the nearest 0.1 mg on the filter. The sample support and sample are placed near the outlet end of the tube furnace and dry air used to sweep the inside of the tube during the furnace run.

Formaldehyde, released by the curing sample, is trapped and measured using two impingers connected in series downstream from the exit of the tube furnace. Into each of the impingers is placed 20 ml of a 2,4-dinitrophenolhydrazine (2,4 DNPH) solution. The latter solution is composed of 2.50 g. of 2,4 DNPH and 1000 ml. of acetonitrile also containing 5 ml of glacial acetic acid to facilitate the reaction between 2,4 DNPH and formaldehyde. The 2,4-dinitrophenylhydrazone derivative is analyzed by high pressure liquid chromatography (HPLC). Ammonia emissions are studied in separate experiments. In these, acidified water (10N sulfuric acid) is used as the trapping reagent. Analysis for ammonia is by ion selective electrode. The temperature profile included holding the sample at 200° C. for ten minutes thus simulating the entire application and curing process in one step.

COMPARATIVE EXAMPLE 1

A 70/30 urea-extended binder was prepared by reacting Neste 368ST alkaline phenol/formaldehyde resole resin containing 70 parts by weight of resole solids with 30 parts by weight of urea and allowing the mixture to stand overnight while stirring, to form a prereact. Just prior to application onto the fiberglass sample, 3 weight per cent of ammonium sulphate was added as a catalyst. The resulting solution was diluted to form binders containing 20%, 26.7% and 40% by weight solids, and applied to the fiberglass filter as previously described. Ammonia emissions from the curing sample were monitored and are reported in Table I.

EXAMPLES 1 AND 2

To the 70/30 urea-extended resin prereact of Comparative Example 1, but without the ammonium sulphate catalyst, was added sufficient polyacrylic acid to obtain 25 weight per cent and 50 weight per cent polyacrylic acid solids, based on total solids, respectively. The polyacrylic acid was unneutralized and exhibited a molecular weight as measured by gel permeation chromatography (GPC) of approximately 3000. Resin systems were applied to glass fiber filter media and were tested as indicated previously. Ammonia emissions are reported in Table I.

TABLE I

Ammonia Emissions From A Series of 70/30 Extended Binders Blended With PAA

| Example | Polyacrylic Acid Content | Ammonium Sulfate % | Ammonia Emissions, ppm | | |
|---|---|---|---|---|---|
| | | | 20% Solids | 26.7% Solids | 40% Solids |
| Comp. Example 1 | 0.0 | 3 | 8116 | 5259 | 3908 |
| Example 1 | 25% | 0 | 5767 | 4124 | |
| Example 2 | 50% | 0 | 3281 | | 1557 |

Examination of Table I indicates that ammonia emissions decrease substantially when polyacrylic acid is substituted for phenol/formaldehyde resin. Moreover, close examination of the data presented in Table I illustrates that the amount of ammonia reduction is far more than could be expected using merely a dilution model. In particular, at the 20% solids level and with 50% polyacrylic acid, one would expect ammonia emissions in the range of 4050 ppm, whereas the emissions actually measured are considerably lower than this by approximately 20%. It should be noted further, that the use of polyacrylic acid has eliminated the need for the ammonium sulphate catalyst.

COMPARATIVE EXAMPLES 2 and 3

Examples 2 and 3 of the subject invention were repeated, however, the polyacrylic acid utilized in Examples 2 and 3 was replaced by a commercial two-part mixture of polyacrylic acid and a hydroxyl-functional polymeric curing agent which in the absence of any formaldehyde resin yields a crosslinked polymer composition by polyesterification at the elevated cure temperature. The amount of ammonium sulphate catalyst was reduced from the 3% in Comparative Example 1 to 2.25 weight per cent and 1.5 weight per cent, respectively. Samples were applied to fiberglass as indicated previously, and ammonia emissions measured. The results and that of Comparative Example 1, the control, are presented in Table II.

TABLE II

Ammonia Emissions From A Series of 70/30 Extended Binders Blended With Self-Curing Resin

| Example | Co-Polymer System | Ammonium Sulfate % | Ammonia Emissions, ppm | | |
|---|---|---|---|---|---|
| | | | 20% Solids | 26.7% Solids | 40% Solids |
| Comp. Example 1 | 0.0 | 3 | 8116 | 5259 | 3908 |
| Comp. Example 2 | 25% PAA/Polyol | 2.25 | 16989 | 12592 | |
| Comp. Example 3 | 50% PAA/Polyol | 1.5 | 21320 | | 16338 |

As can be seen from Table II, where an alternative mode of reaction for the polyacrylic acid is presented, the polyacrylic acid may react with its hydroxyl-functional coreactant exclusive of the phenol/formaldehyde/urea prereact, or may otherwise interfere with the reaction of the polyacrylic acid and the formaldehyde resin solids, thus producing an entirely different result than that presented in Table I. As can be seen from Table II, rather than decrease the ammonia emissions, ammonia emissions are actually increased. Thus, the additional resin components utilized in Comparative Examples 2 and 3 are not "non-curable acidic polyacrylates effective to lower ammonia emissions" and are not contemplated by the subject invention.

While the focus of the experimental results presented thus far has been in lowering ammonia emissions, it is important that formaldehyde emissions not be increased, and preferably be decreased. It has been found, somewhat surprisingly, that in contradiction to the statement in U.S. Pat. No. 5,108,798 that dilution of a phenol/formaldehyde resin system with the resin system therein presented should lower formaldehyde emissions, that actually emissions are retained at essentially the same level upon dilution, even upon dilution at a 50% level, where one would expect a 50% reduction in formaldehyde emissions based on a dilution effect. Formaldehyde emissions of Comparative Examples 1, 2 and 3 and subject invention Examples 1 and 2 were measured as previously indicated. Results of the formaldehyde emissions are presented in Table III.

TABLE III

Formaldehyde Emissions From 70/30 Extended Binders

| Example | Ammonium Sulfate % | Formaldehyde Emissions, ppm | | |
|---|---|---|---|---|
| | | 20% Solids | 26.7% Solids | 40% Solids |
| Comp. Example 1 | 3 | 5145 | 3441 | 1732 |
| Comp. Example 2 | 2.25 | 5816 | 4154 | |
| Comp. Example 3 | 1.5 | 6338 | | 2502 |
| Example 1 | 0 | 5750 | 3607 | |
| Example 2 | 0 | 6101 | | 1924 |

Table III indicates that formaldehyde emissions are slightly increased by the addition of both a curable polymer resin system as well as an acid polyacrylate in accordance with the present invention. However, the increase is marginal, and appears to be somewhat less for the polymer systems of the subject invention as compared to a curable polyacrylate system. However, due to the drastic decrease in ammonia emissions as a result of employment of the acid polyacrylates of the subject invention, it is possible to add additional urea over and above that traditionally used with phenol/formaldehyde resins to further act as a scavenger for formaldehyde and keep the overall emissions of both ammonia and formaldehyde to lower levels than previously thought possible.

COMPARATIVE EXAMPLE 4

A 70/30 urea extended prereact catalyzed with 2% ammonium sulfate was subjected to DMA analysis at a frequency of 10 Hz over a temperature range of 80°–200° C. at a temperature ramp of 4° C./min. The bending E' trace is shown in FIG. 1. The resin is substantially cured at 170° C. and has a stiffness of c.a. $2 \times 10^8$ Pa at 200° C.

COMPARATIVE EXAMPLE 5

A mixture of 2000 mw polyacrylic acid and a 99.7% hydrolyzed polyvinylalcohol having a molecular weight of c.a. 78,000 were dissolved in water in a 1:1 mole ratio and subjected to DMA as in Comparative Example 4. A final stiffness of $1 \times 10^8$ Pa is achieved, indicating that the monomer mixture itself is capable of preparing a crosslinked polymer. It is also apparent that the polyesterification is not substantially complete until a temperature in excess of 220° C. has been reached.

EXAMPLES 3 AND 4

To the urea-extended Phenol/formaldehyde resin of Comparative Example 4 was added polyacrylic acid having a nominal molecular weight by GPC of 3000, such that the phenol/formaldehyde/urea solids to polyacrylic acid ratio was 1:1. In Example 3, the polyacrylic acid was partially neutralized to a pH of 3 with sodium hydroxide prior to addition to the formaldehyde resin. In Example 4, the polyacrylic acid was partially neutralized to a pH of 4. The DMA traces are shown in FIGS. 3 and 4, respectively.

Figure 3:
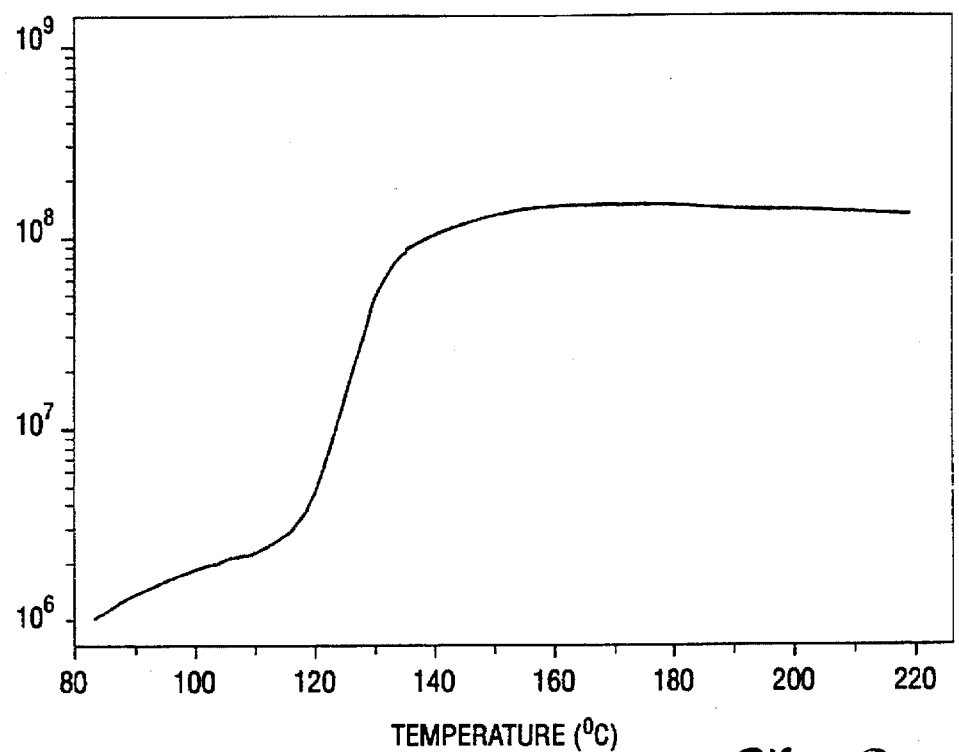
FIG. 3 is a DMA trace for a binder as in FIG. 1 containing 50% polyacrylic acid partially neutralized to pH 3.
Figure 4:
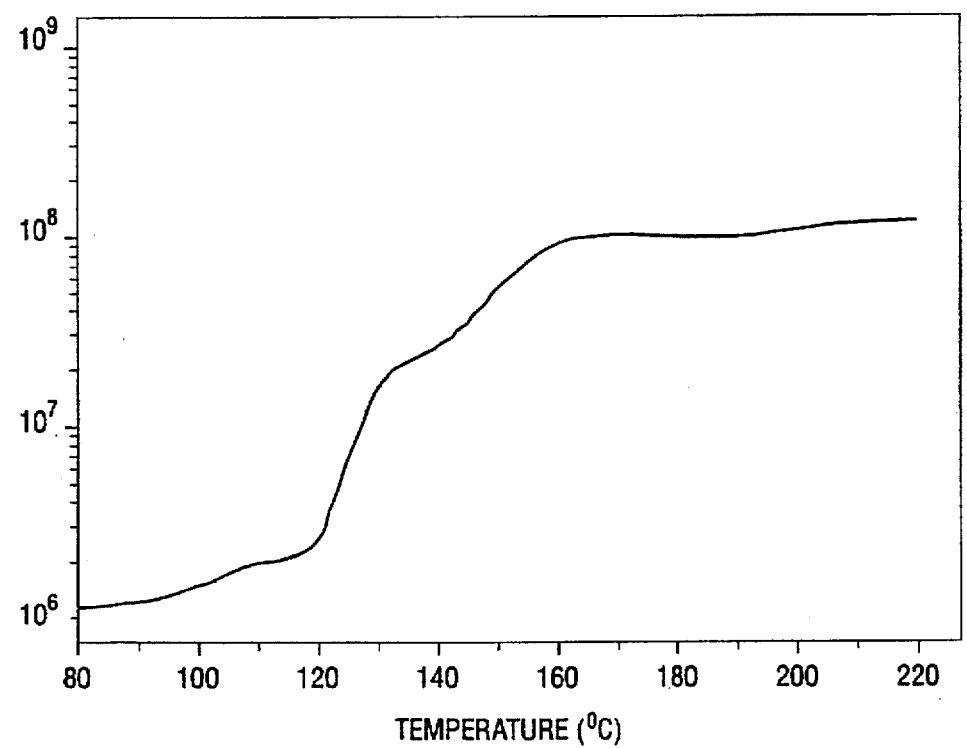
FIG. 4 is a DMA trace for a binder as in FIG. 1 containing 50% polyacrylic acid partially neutralized to pH 4.

In FIG. 3, it is noteworthy that the onset of cure occurs at a much lower temperature than in Comparative Example 1, and cure is substantially complete at 160° C. FIG. 4, where the polyacrylic acid pH is slightly higher, exhibits a slightly delayed cure with respect to the more acidic system of FIG. 3. Both systems exhibit a final stiffness on the order of $1.5 \times 10^8$ Pa. In FIG. 4, a slight increase in stiffness above 200° C. may possibly be attributed to anhydride formation from carboxylic acid groups in excess of the amount required to react with the phenol/formaldehyde/urea solids. The DMA traces of FIGS. 3 and 4 support the hypothesis that the polyacrylic acid reacts with the formaldehyde resin components, as polyacrylic acid itself does not cure to a crosslinked thermoset state, and thus a system containing significant unreacted polyacrylic acid would be expected to be of low stiffness at 200° C.

EXAMPLES 5–8, COMPARATIVE EXAMPLES 6–7

A plant trial was conducted to assess the thickness and rigidity of fiberglass blankets using conventional phenol/formaldehyde resins alone (Comparative Examples 6 and 7) and the same resin with the addition of polyacrylic acid (Examples 5 and 6), polyacrylic acid with a minor amount of hydroxyl functional crosslinker (Example 7) and polyacrylic acid with further addition of urea (Example 8).

A pre-react solution consisting of a standard commercial alkaline phenol/formaldehyde resin fiberglass resin (Neste 368ST) and a urea solution was made up such that the resin to urea ratio was 70/30 on a solids basis. After the normal pre-react time of around 18 hours, the approximately 43% solids solution was in-line mixed with a solution containing an additive and an appropriate quantity of a diaminosilane (Dow Corning Z6020), and a soft water stream. These components were then delivered to six sets of nine spraying nozzles where they were hydraulically dispersed. The nozzles were arranged in six circles spraying the binders towards the center of the fiberglass from a distance of about 8 inches. The fiberglass was manufactured using a standard fiberglass spinning machine located approximately 12 inches above each circle of nozzles. The fiberglass production and binder spray rates were kept constant such that the final cured binder content represented about 5 weight % of the finished product. Of that cured binder content, approximately 0.2% represented the silane. Additive solutions of ammonium sulfate and polycarboxylic acid polymers were employed such that the compositions of the final cured binders were as represented in Table IV. The final solids content of the binders as sprayed was around 12%. The results are presented below in Table IV.

TABLE IV

Fiberglass Samples With Experimental Binders

| EXAMPLE | SAMPLE | INITIAL RESULTS | | ONE WEEK RESULTS | | ONE MONTH RESULTS | |
|---|---|---|---|---|---|---|---|
| | | Thickness | Rigidity | Thickness | Rigidity | Thickness | Rigidity |
| Comp. Example | 3% Ammonium Sulfate | 7.37 | 4.54 | 6.88 | 4.50 | 5.80 | 6.90 |
| Example 5 | 3% Ammonium Sulfate + 25% PAA[1] | 7.39 | 4.83 | 6.86 | 4.98 | 6.30 | 5.10 |
| Example 6 | 25% PAA[2] | 7.29 | 4.83 | 6.77 | 4.50 | 6.51 | 5.52 |
| Example 7 | 25% PAA | 7.30 | 4.44 | 6.96 | 4.28 | 6.02 | 5.04 |
| Comp. Example 7 | 3% Ammonium Sulfate | 7.27 | 5.75 | 6.71 | 5.00 | 5.68 | n.m. |
| Example 8 | 25% PAA + 8% Urea | 7.07 | 6.04 | 6.48 | 5.22 | 5.45 | 7.00 |

[1]Crosslinker and proprietary catalyst in minor amount.
[2]Contains minor amount of proprietary catalyst.

Table IV indicates that addition of polyacrylic acid (PAA) and polyacrylic acid with a minor amount of crosslinker to conventional phenol/formaldehyde resins results in binder compositions capable of producing fiberglass blankets under commercial production conditions having superior thickness recovery and improved droop as compared to the binder system not containing the polyacrylic acid. The results further show that the addition of minor amounts of crosslinker, while not providing the same degree of improvement demonstrated by polyacrylic acid alone, is nevertheless an unexpected improvement over polyacrylic acid-free binders. Addition of urea is shown to be feasible, as although properties are lowered somewhat, they are still satisfactory.

Having now fully described the invention, it will be apparent to one of ordinary skill in the art that many changes and modifications can be made thereto without departing from the spirit or scope of the invention as set forth herein.

What is claimed is:

1. A low total emission process for preparation of a binder-coated fiberglass product, comprising:
   (a) selecting as one component of said binder, an aqueous phenol/formaldehyde resin which has been extended with a nitrogenous compound to form an extended phenol/formaldehyde resin;
   (b) adding to said extended phenol/formaldehyde resin an amount of a non-curable acidic polyacrylate effective to reduce ammonia emissions during cure of the combination (a) and (b) below that produced during the cure of (a) alone;
   (c) applying an aqueous mixture comprising (a) and (b) to fiberglass in need of binder-coating to form a binder-containing fiberglass;
   (d) curing said binder-containing fiberglass at elevated temperature to form a binder-coated fiberglass product.

2. The process of claim 1 wherein the weight ratio of (a):(b) is from 95:5 to about 40:60.

3. The process of claim 1 wherein the weight ratio of (a):(b) is from about 90:10 to about 50:50.

4. The process of claim 1 wherein said acidic polyacrylate is a polyacrylic acid homopolymer having a molecular weight as measured by GPC of from 100 to about 500,000.

5. The process of claim 1 wherein said acidic polyacrylate is a copolymer of one or more unsaturated mono- or dicarboxylic acids and optionally one or more additional unsaturated monomers optionally substituted by an organic group which is essentially non-reactive with carboxyl groups at said elevated curing temperature of step (d).

6. The process of claim 5 wherein said unsaturated mono- or dicarboxylic acids are selected from the group consisting of acrylic acid, methacrylic acid, maleic acid, and mixtures thereof.

7. The process of claim 5 wherein said additional unsaturated monomers are selected from the group consisting of $C_{1-8}$ alkylacrylates, $C_{1-8}$ alkylmethacrylates, maleic anhydride, ethylene, propylene, styrene, α-methylstyrene, p-methylstyrene, vinyl butyrate, methylvinyl ether, acrylonitrile, acrylamide, vinyl acetate, vinyl chloride, N-vinyl pyrollidone, and mixtures thereof.

8. The process of claim 5 wherein said acidic polyacrylate comprises 50 mol % or more of moieties selected from the group consisting of acrylic acid, methacrylic acid, maleic acid, and mixtures thereof.

9. The process of claim 1 wherein said acidic polyacrylate is partially neutralized such that an aqueous solution of said partially neutralized acidic polyacrylate has a pH less than 7.

10. The process of claim 1 wherein said extended phenol/formaldehyde resin is an alkaline phenol/formaldehyde resin extended with from 10 to about 50 weight per cent of a nitrogenous extender selected from the group consisting of urea, substituted ureas, dicyandiamide, melamine, methylolated melamine and mixtures thereof.

11. The process of claim 9 wherein said nitrogenous extender is selected from the group consisting of urea and methylolated urea.

12. A low total emission process for preparation of a binder-coated fiberglass product, comprising:
   (a) selecting as one component of said binder, an aqueous phenol/formaldehyde alkaline resole resin which has been extended with a nitrogenous compound to form an extended phenol/formaldehyde resin;
   (b) adding to said extended phenol/formaldehyde resin an amount of a water soluble non-curable acidic polyacrylate effective to reduce ammonia emissions during cure of the combination (a) and (b) below that produced during the cure of (a) alone;
   (c) applying an aqueous mixture comprising (a) and (b) to fiberglass in need of binder-coating to form a binder-containing fiberglass;
   (d) curing said binder-containing fiberglass at elevated temperature to form a binder-coated fiberglass product, wherein said acidic polyacrylate is a polyacrylate copolymer greater than 50 mol % of moieties derived from acrylic acid, methacrylic acid and maleic acid, optionally containing acrylonitrile and styrene comonomers.

13. A heat-curable aqueous resin system with reduced emission of ammonia upon cure, comprising:
   (a) from 40% to about 95% by weight based on the sum of (a) and (b) of a nitrogenous formaldehyde resin prepared by reacting formaldehyde with a nitrogenous monomer selected from the group consisting of urea, dicyandiamide, melamine, and mixtures thereof, optionally also with phenol, said nitrogenous formaldehyde resin one which emits ammonia upon curing at elevated temperature;

(b) from 60% to about 5% by weight of a noncurable, acidic polyacrylate, wherein total ammonia emissions of said resin system are less than that which may be calculated based upon the ammonia emission of (a) alone when diluted with (b).

14. The heat-curable aqueous resin system of claim 13 wherein the nitrogenous formaldehyde resin comprises an alkaline phenol/formaldehyde resole extended with urea.

15. The heat-curable aqueous resin system of claim 14 wherein said acidic polyacrylate comprises a copolymer of one or more unsaturated mono- or dicarboxylic acids and optionally one or more additional unsaturated monomers.

16. The heat-curable aqueous resin system of claim 14 wherein said additional unsaturated monomer is selected from the group consisting of maleic anhydride, $C_{1-8}$ alkylacryaltes, $C_{1-8}$ alkylmethacrylates, ethylene, propylene, styrene α-methylstyrene, p-methylstyrene, vinylbutyrate, vinylmethyl ether, acrylonitrile, acrylamide, vinyl acetate, vinyl chloride, N-vinylpyrollidone, and mixtures thereof.

17. The heat-curable aqueous resin system of claim 13 wherein said acidic polyacrylate is a polyacrylic acid homopolymer.

18. The heat-curable aqueous resin system of claim 13 wherein said acidic polyacrylate is a copolymer of one or more mono- or dicarboxylic acids selected from the group consisting of acrylic acid, methacrylic acid, and maleic acid.

19. The heat-curable aqueous resin system of claim 13 wherein said acidic polyacrylate comprises 50 mol % or more of moieties derived from one or more mono- or dicarboxylic acids selected from the group consisting of acrylic acid, methacrylic acid, and maleic acid, and one or more unsaturated comonomers selected from the group consisting of maleic anhydride, methylmethacrylate, methylacrylate, styrene, and acrylonitrile.

20. The heat-curable aqueous resin system of claim 13, wherein said acidic polyacrylate is partially neutralized such that said partially neutralized acidic polyacrylate has an aqueous pH of less than 7.0.

21. A binder-coated fiberglass product, comprising:

(a) glass fibers (b) a cured binder composition comprising the co-cured reaction product of:
  i) a nitrogenous formaldehyde resin in an amount of from 40 to about 95% by weight based on the weight of (b)(i) and (b)(ii), and ii) from 60% to about 5% based on the weight of (b)(i) and (b)(ii) of a non-curable water-soluble acidic polyacrylate.

22. The binder-coated fiberglass product of claim 21 wherein the weight ratio of (b) (i) : (b) (ii) is from 90:10 to about 50:50.

23. The binder-coated fiberglass product of claim 21 wherein the weight ratio of (b)(i):(b)(ii) is from about 80:20 to about 50:50.

24. The binder-coated fiberglass product of claim 21 wherein said acidic polyacrylate is a polyacrylic acid homopolymer having a molecular weight as measured by GPC of from 100 to about 500,000.

25. The binder-coated fiberglass product of claim 21 wherein said acidic polyacrylate is a copolymer of one or more unsaturated mono- or dicarboxylic acids and optionally one or more additional unsaturated monomers optionally substituted by an organic group which is essentially non-reactive with carboxyl groups at the elevated curing temperature of step (d).

26. The binder-coated fiberglass product of claim 25 wherein said unsaturated mono- or dicarboxylic acids are selected from the group consisting of acrylic acid, methacrylic acid, maleic acid, and mixtures thereof.

27. The binder-coated fiberglass product of claim 25 wherein said additional unsaturated monomers are selected from the group consisting of $C_{1-8}$ alkylacrylates, $C_{1-8}$ alkylmethacrylates, maleic anhydride, ethylene, propylene, styrene, α-methylstyrene, p-methylstyrene, vinylbutyrate, methylvinyl ether, acrylonitrile, acrylamide, vinylacetate, vinyl-chloride, N-vinyl pyrollidone, and mixtures thereof.

28. The binder-coated fiberglass product of claim 21 wherein said acidic polyacrylate comprises 50 mol % or more of moieties selected from the group consisting of acrylic acid, methacrylic acid, maleic acid, and mixtures thereof.

29. The binder-coated fiberglass product of claim 21 wherein said acidic polyacrylate is partially neutralized such that an aqueous solution of said partially neutralized acidic polyacrylate has a pH less than 7.

30. The binder-coated fiberglass product of claim 21 wherein said nitrogenous formaldehyde resin is an alkaline phenol/formaldehyde resole resin extended with from 10 to about 50 weight per cent of a nitrogenous extender selected from the group consisting of urea, substituted ureas, dicyandiamide, melamine, methylolated melamine and mixtures thereof.

* * * * *